(12) United States Patent
Nishikouji et al.

(10) Patent No.: US 7,153,547 B2
(45) Date of Patent: *Dec. 26, 2006

(54) BIREFRINGENT OPTICAL FILM, ELLIPTICALLY POLARIZING PLATE USING THE SAME, AND LIQUID CRYSTAL DISPLAY USING THE SAME

(75) Inventors: Yuuichi Nishikouji, Ibaraki (JP); Nao Murakami, Ibaraki (JP); Masaki Hayashi, Ibaraki (JP); Hiroyuki Yoshimi, Ibaraki (JP)

(73) Assignee: Nitto Denko Corporation, Ibaraki (JP)

(*) Notice: Subject to any disclaimer, the term of this patent is extended or adjusted under 35 U.S.C. 154(b) by 371 days.

This patent is subject to a terminal disclaimer.

(21) Appl. No.: 10/736,978

(22) Filed: Dec. 17, 2003

(65) Prior Publication Data

US 2004/0202849 A1 Oct. 14, 2004

(30) Foreign Application Priority Data

Dec. 19, 2002 (JP) .............................. 2002-368898

(51) Int. Cl.
*G02F 1/1335* (2006.01)
*C09K 19/00* (2006.01)
*B32B 27/36* (2006.01)

(52) U.S. Cl. .................. 428/1.1; 428/412; 349/117; 349/118

(58) Field of Classification Search ................ 428/1.1, 428/412; 349/117, 118
See application file for complete search history.

(56) References Cited

U.S. PATENT DOCUMENTS 5,344,916 A 9/1994 Harris ..................... 528/353
5,750,641 A 5/1998 Ezzell ..................... 528/353
6,565,974 B1 * 5/2003 Uchiyama et al. .......... 428/412
6,800,697 B1 10/2004 Uchiyama et al.

FOREIGN PATENT DOCUMENTS

| EP | 1 160 591 A | 12/2001 |
|----|-------------|---------|
| JP | 03-24502 A | 2/1991 |
| JP | 03-033719 A | 2/1991 |
| JP | 08-511812 A | 12/1996 |
| JP | 10-508048 A | 8/1998 |
| JP | 2000-511296 A | 8/2000 |
| JP | 2001-49110 A | 2/2001 |
| JP | 2001-343529 A | 12/2001 |
| WO | WO 96/11967 | 4/1996 |

* cited by examiner

*Primary Examiner*—Bruce H. Hess
*Assistant Examiner*—Lawrence Ferguson
(74) *Attorney, Agent, or Firm*—Westerman, Hattori Daniels & Adrian LLP (57) ABSTRACT

The present invention provides a birefringent optical film having a high orientation for easily obtaining a desired retardation value and also a small photoelastic coefficient. The birefringent optical film includes at least two kinds of polymer materials. A total of products of Cn and Wn satisfies a numerical formula (1):

$$\Sigma(C_n \times W_n) \leq 30 \times 10^{-8} \text{ cm}^2/N \qquad (1)$$

where Cn and Wn denote respectively a photoelastic coefficient and a volume fraction of each polymer material, and at least one of the polymer materials of the film has a photoelastic coefficient value of at least $60 \times 10^{-8}$ cm²/N.

10 Claims, 1 Drawing Sheet

Fig.1

BIREFRINGENT OPTICAL FILM, ELLIPTICALLY POLARIZING PLATE USING THE SAME, AND LIQUID CRYSTAL DISPLAY USING THE SAME

BACKGROUND OF THE INVENTION

1. Field of the Invention

The present invention relates to a birefringent optical film, an elliptically polarizing plate using the optical film, and a liquid crystal display using the elliptically polarizing plate having the birefringent film.

2. Description of Related Art

Conventionally, birefringent films for optical compensation, which are used in various liquid crystal displays, have been manufactured by film-stretching techniques. Regarding the stretching, for example, JP 3(1991)-33719 A discloses roller tensile stretching, roller press stretching, and tenter uniaxial stretching. JP 3(1991)-24502 A discloses biaxial stretching under a condition of providing anisotropy. Regarding other methods of manufacturing birefringent films, for example, JP 8(1996)-511812 A discloses a method of processing a soluble polyimide into a film so as to provide negative uniaxiality.

By using the above-described or other techniques of film stretching, optical properties such as $nx \geq ny > nz$ can be applied to the film (nx and ny denote main refractive indices in the film plane, and nz denotes a refractive index in the thickness direction of the film). This birefringent film arranged between a driving cell and a polarizer can be used as a viewing angle compensation film for a liquid crystal cell, thereby widening a viewing angle of a liquid crystal display.

For example, a biaxial birefringent film can be used as an optical compensation film for obtaining a wide viewing angle in a vertical alignment (VA) mode liquid crystal display with a multi-domain alignment. This biaxial birefringent film can be obtained in general by stretching a polymer film. Specifically for example, it can be obtained by stretching in two directions (x- and y- directions) on a film surface, or a fixed-end uniaxial stretching, i.e., stretching the film in a transverse direction while the film is fixed at one end in the longitudinal direction (e.g., a transverse stretching with a tenter).

In general, the three-dimensional refractive indices nx, ny and nz in the biaxial birefringent film can be controlled. Particularly, an in-plane retardation value $\Delta nd$ and a retardation value Rth in a thickness direction can be controlled. The $\Delta nd$ and Rth are represented by the following equations, where d denotes a thickness of a birefringent film.

$$\Delta nd = (nx-ny) \cdot d$$

$$Rth = (nx-nz) \cdot d$$

The above-described $\Delta nd$ and Rth can be controlled, for example, by the stretching temperature, the stretching rate in the x- and y-directions or the like. Specifically for example, $\Delta nd$ can be controlled by a ratio of the x-direction stretching to the y-direction stretching, while Rth can be controlled by stretching degrees in the x- and y-directions. Formation of Rth is especially important for a biaxial birefringent film. Particularly, compensation of the birefringence of a VA mode liquid crystal depends largely on the Rth.

In forming the Rth, when the polymer material (e.g., polycarbonate) of the birefringent film has a high stretching orientation, a desired Rth can be obtained without increasing considerably the stretching degrees in the x- and y-directions. However, since the material will increase the photoelastic coefficient as well, the refractive indices will be varied easily when slight external force due to dimensional change of a polarizing plate or the like is applied. In addition to that, in a liquid crystal display assembled with this film, the contrast deteriorates partially under a severe condition caused by application of heat or moisture, and this causes considerable damage in the in-plane uniformity.

A birefringent film made of a material having a small photoelastic coefficient (e.g., a polynorbornene-based material) experiences substantially no changes in the birefringence even when applied with external force. A liquid crystal display assembled with this film will not lose its uniformity in the display even under the above-mentioned severe condition. However, since the material has a low stretching orientation, a single film may not provide sufficient Rth. For obtaining a desired Rth with the film, it is required to increase the stretching rates in the x- and y-directions and also using a plurality of retardation plates. This will cause degradation in accuracy of $\Delta nd$ and Rth, degradation of the optical axis accuracy due to a bowing phenomenon, increase in panel thickness, and a cost rising.

That is, any of the conventional techniques has a difficulty in obtaining a birefringent film providing both a high orientation for obtaining easily a desired retardation value and a small photoelastic coefficient for reducing irregularities in the contrast during a durability test performed by applying heat and/or moisture.

SUMMARY OF THE INVENTION

For solving the above-described problems, an object of the present invention is to provide a birefringent optical film having improved orientation and a small photoelastic coefficient.

For achieving the object, a birefringent optical film of the present invention refers to a birefringent optical film containing at least two kinds of polymer materials, wherein a total of products of Cn and Wn satisfies the following numerical formula (1), and the film contains at least one kind of polymer material having a photoelastic coefficient of at least $60 \times 10^{-8}$ cm$^2$/N.

$$\Sigma(Cn \times Wn) \leq 30 \times 10^{-8} \text{ cm}^2/N \quad (1)$$

In the formula (1), Cn denotes a photoelastic coefficient of each polymer material, and Wn denotes a volume fraction of each polymer material in the total volume of polymer materials in the birefringent optical film.

After keen studies of the photoelasticity of the birefringent optical film, the inventors have found that when the polymer material contained in the birefringent optical film satisfies the numerical formula (1), the film as a whole can have a small photoelastic coefficient. When an optical film contains at least one polymer material having a photoelastic coefficient value of at least $60 \times 10^{-8}$ cm$^2$/N, the orientation can be improved further. By using the birefringent optical film of the present invention, a liquid crystal display having both optical compensation and display uniformity can be provided.

The photoelastic coefficient in the present invention denotes a coefficient representing a stress dependency of a birefringence for a material showing a photoelastic effect, i.e., an elastic material applied with external force turns temporarily into an optical isomer and presents birefringence, and it turns back to its original state after the external force is eliminated. In other words, a relationship between the in-plane birefringence Δnxy and a photoelastic coefficient is represented by the following equation. Therefore, the retardation value of the optical film will change when external force is applied.

Δnxy=C·σ(C and ·σ respectively denote a photoelastic coefficient and stress)

DETAILED DESCRIPTION OF THE INVENTION

A birefringent optical film of the present invention, an elliptically polarizing plate using the birefringent optical film, and a liquid crystal display using them are described below in detail.

In the present invention, at least one polymer material has a photoelastic coefficient of at least $60 \times 10^{-8}$ cm$^2$/N. The polymer material can provide a high orientation to the birefringent optical film of the present invention. A preferable range for the photoelastic coefficient of the polymer material is from $65 \times 10^{-8}$ cm$^2$/N to $300 \times 10^{-8}$ cm$^2$/N, or more preferably, from $70 \times 10^{-8}$ cm$^2$/N to $200 \times 10^{-8}$ cm$^2$/N.

For an index to evaluate a photoelasticity of the entire birefringent optical film of the present invention, a total of products of Cn and Wn, i.e., Σ(Cn×Wn), is used. Here, Cn and Wn denote respectively a photoelastic coefficient and a volume refraction of each polymer material. When the Σ(Cn×Wn) is within the range of the numerical formula (1), irregularities in the contrast can be suppressed even if a liquid crystal display including the birefringent optical film of the present invention is under an unfavorable condition, for example, at high temperatures and/or humidity. For example, from an aspect of further improved display uniformity in the liquid crystal display, the Σ(Cn×Wn) is preferably from $-25 \times 10^{-8}$ cm$^2$/N to $25 \times 10^{-8}$ cm$^2$/N, or more preferably, from $-20 \times 10^{-8}$ cm$^2$/N to $20 \times 10^{-8}$ cm$^2$/N.

The polymer material used in a birefringent optical film of the present invention is not limited specifically as long as it satisfies the above Σ(Cn×Wn) and it is optically transparent.

The structure of the birefringent optical film of the present invention is not limited specifically. It can be an optical film of a monolayer formed by mixing at least two kinds of polymer materials, or comprising such a mixture. Alternatively, it can be an optical film of a laminate formed of polymer layers, and each of the polymer layers can contain a single or plural polymer material(s). When the birefringent optical film of the present invention composes the laminate, the polymer materials forming the respective polymer layers can contain polymer materials common to those of the other polymer layers.

Alternatively, for example, the laminate can contain a polymer layer formed of a polymer material having a photoelastic coefficient of at leas $60 \times 10^{-8}$ cm$^2$/N and a polymer layer formed of a polymer material other than the above-mentioned one.

It is preferable that the anisotropy of the birefringent optical film of the present invention satisfies nx≧ny>nz in a polymer layer formed of a polymer material having a photoelastic coefficient of at least $60 \times 10^{-8}$ cm$^2$/N, where nx and ny denote respectively main refractive indices in two directions in the layer plane, and nz denotes a refractive index in the thickness direction of the layer. A birefringent optical film including the polymer layer having the optical property represented as nx≧ny>nz can be used suitably for a viewing angle compensation film of a liquid crystal cell.

Regarding the orientation of the birefringent optical film of the present invention, it is preferable that Δnxz is in a range of 0.005 to 0.1 in an evaluation with an equation Δnxz=(nx−nz) in a polymer layer formed of a polymer material having a photoelastic coefficient of at least $60 \times 10^{-8}$ cm$^2$/N. When the Δnxz is 0.005 or higher, for example, there is no need for increasing the thickness of the film to obtain a sufficient Rth, thereby restricting the photoelastic coefficient for the entire films. When the Δnxz is 0.1 or lower, for example, the phase difference can be controlled. A more preferable range for the Δnxz is 0.007 to 0.08, or further preferably, from 0.01 to 0.06.

There is no specific limitation on a method of manufacturing a birefringent optical film of the present invention. For example, it can be manufactured by coating a polymer material of the present invention on a film base or the like. In such a case, the polymer material can be melted by heat. Alternatively, it can be dissolved in a solvent to provide a polymer solution, which will be then coated. From an aspect of the production efficiency and control of optical anisotropy or the like, coating the polymer solution is preferred. When using the polymer solution, from an aspect of its viscosity or the like, it is preferable for example that 5 to 50 parts by weight, or more preferably, 10 to 40 parts by weight of the polymer material is used with respect to 100 parts by weight of the solvent.

In a process of coating the polymer solution on a film base or the like, the film base can be used as a polymer layer of the present invention. For example, a polymer layer is formed on the film base by coating the polymer solution so that a laminate of two layers is formed. In this manner, there is no need for using separately the film base or the like, and this contributes to cost reduction or the like. This process is advantageous also from an aspect of efficiency, since some steps such as transcription or peeling after film formation can be omitted.

The coating of the polymer solution can be carried out by a suitable method such as spin coating, roller coating, flow coating, printing, dip coating, film flow-expanding, bar coating or gravure printing.

Various methods can be selected for orientating polymer materials so as to provide optical anisotropy. For example, a polymer solution prepared by dissolving a polymer material in an organic solvent or the like is coated and subsequently dried for an orientation in the thickness direction (nx>nz). Alternatively, the polymer material can be oriented through stretching.

The stretching is carried out preferably, for example, by coating the polymer solution on a stretchable base and stretching the base. Examples of the stretching methods include stretching the film uniaxially in the longitudinal direction (free-end longitudinal stretching), stretching the film uniaxially in the transverse direction while the film is fixed in the longitudinal direction (fixed-end transverse stretching), and stretching the film both in the longitudinal and transverse directions (biaxial stretching).

When the birefringent optical film of the present invention composes the laminate, the stretchable base can be used as a polymer film of the present invention. For example, an orientated two-layer laminate is provided by coating the polymer solution on a base of the stretchable polymer material and stretching as mentioned above. In this case, it is preferable that the polymer material in the polymer solution to be coated on the base have a photoelastic coefficient of at least $60 \times 10^{-8}$ cm²/N.

When the birefringent optical film of the present invention forms the laminate, the polymer layer can be laminated directly as mentioned above. Alternatively, polymer layers prepared separately can be bonded directly or indirectly, for example, through an adhesive, a pressure-sensitive adhesive or the like.

In general, a birefringent optical film of the present invention has a thickness from 10 μm to 500 μm, preferably from 15 μm to 400 μm, and more preferably from 20 μm to 300 μm. When the birefringent optical film of the present invention is a laminate of polymer layers formed by using an adhesive or a pressure-sensitive adhesive, each layer of the adhesive or the pressure-sensitive adhesive has a thickness typically from 10 nm to 100 μm, preferably from 20 nm to 70 μm, and more preferably from 30 nm to 50 μm.

It is preferable from an aspect of efficiency in the processes such as stretching that the polymer material used in the present invention be thermoplastic and that it have a photoelastic coefficient of at least $60 \times 10^{-8}$ cm²/N. Examples of the polymer material include polyamide, polyimide, polyester, polyetherketone, polyamideimide, and polyesterimide.

The polyetherketone as a polymer material may be, for example, polyaryletherketone represented by the general chemical formula (1) below, which is disclosed in JP 2001-49110 A.

In the above chemical formula (1), X is a substituent, and q is the number of substitutions therein. X is, for example, a halogen atom, a lower alkyl group, a halogenated alkyl group, a lower alkoxy group or a halogenated alkoxy group, and when there are plural Xs, they may be the same or different.

The halogen atom may be, for example, a fluorine atom, a bromine atom, a chlorine atom or an iodine atom, and among these, a fluorine atom is preferable. The lower alkyl group preferably is a $C_{1-6}$ lower straight alkyl group or a $C_{1-6}$ lower branched alkyl group and more preferably is a $C_{1-4}$ straight or branched chain alkyl group, for example. More specifically, it preferably is a methyl group, an ethyl group, a propyl group, an isopropyl group, a butyl group, an isobutyl group, a sec-butyl group or a tert-butyl group, and particularly preferably is a methyl group or an ethyl group. The halogenated alkyl group may be, for example, a halide of the above-mentioned lower alkyl group such as a trifluoromethyl group. The lower alkoxy group preferably is a $C_{1-6}$ straight or branched chain alkoxy group and more preferably is a $C_{1-4}$ straight or branched chain alkoxy group, for example. More specifically, it further preferably is a methoxy group, an ethoxy group, a propoxy group, an isopropoxy group, a butoxy group, an isobutoxy group, a sec-butoxy group or a tert-butoxy group, and particularly preferably is a methoxy group or an ethoxy group. The halogenated alkoxy group may be, for example, a halide of the above-mentioned lower alkoxy group such as a trifluoromethoxy group.

In the above chemical formula (1), q is an integer from 0 to 4. In the chemical formula (1), it is preferable that q=0 and a carbonyl group and an oxygen atom of an ether that are bonded to both ends of a benzene ring are present at para positions.

Also, in the above chemical formula (1), $R^1$ is a group represented by the chemical formula (2) below, and m is an integer of 0 or 1.

In the above chemical formula (2), X' is a substituent and is the same as X in the chemical formula (1), for example. In the chemical formula (2), when there are plural X's, they may be the same or different. And q' indicates the number of substitutions in the X' and is an integer from 0 to 4, preferably, q'=0. In addition, p is an integer of 0 or 1.

In the chemical formula (2), $R^2$ is a divalent aromatic group. This divalent aromatic group is, for example, an o-, m- or p-phenylene group or a divalent group derived from naphthalene, biphenyl, anthracene, o-, m- or p-terphenyl, phenanthrene, dibenzofuran, biphenyl ether or biphenyl sulfone. In these divalent aromatic groups, hydrogen that is bonded directly to the aromatic may be substituted with a halogen atom, a lower alkyl group or a lower alkoxy group. Among them, the $R^2$ preferably is an aromatic group selected from the group consisting of the chemical formulae (3) to (9) below.

(7)

(8)

(9)

In the above chemical formula (1), the $R^1$ preferably is a group represented by the chemical formula (10) below, wherein $R^2$ and p are equivalent to those in the above-noted chemical formula (2).

(10)

Furthermore, in the chemical formula (1), n indicates a degree of polymerization ranging, for example, from 2 to 5000 and preferably from 5 to 500. The polymerization may be composed of repeating units with the same structure or those with different structures. In the latter case, the polymerization form of the repeating units may be a block polymerization or a random polymerization.

Moreover, it is preferable that an end on a p-tetrafluorobenzoylene group side of the polyaryletherketone represented by the chemical formula (1) is fluorine and an end on an oxyalkylene group side thereof is a hydrogen atom. Such a polyaryletherketone can be represented by the general chemical formula (11) below. In the chemical formula below, n indicates a degree of polymerization as in the chemical formula (1).

(11)

Specific examples of the polyaryletherketone represented by the chemical formula (1) may include those represented by the chemical formulae (12) to (15) below, wherein n indicates a degree of polymerization as in the chemical formula (1).

(12)

(13)

(14)

(15)

Other than the above, the polyamide or polyester as a polymer material used in the present invention and having a photoelastic coefficient of at least $60 \times 10^{-8}$ cm$^2$/N may be, for example, polyamide or polyester described by JP 10(1998)-508048 A, and their repeating units can be represented by the general chemical formula (16) below.

(16)

In the above chemical formula (16), Y is O or NH. E is, for example, at least one group selected from the group consisting of a covalent bond, a $C_2$ alkylene group, a halogenated $C_2$ alkylene group, a $CH_2$ group, a $C(CX_3)_2$ group (wherein X is halogen or hydrogen), a CO group, an O atom, an S atom, an $SO_2$ group, an $Si(R)_2$ group and an N(R) group. In the above-mentioned R is at least one of a $C_{1-3}$ alkyl group and a halogenated $C_{1-3}$ alkyl group. The above-mentioned E presents at a meta position or a para position with respect to a carbonyl functional group or a Y group.

Further, in the above chemical formula (16), A and B are substituents, and t and z respectively indicate the numbers of substitutions therein. Additionally, p is an integer from 0 to 3, q is an integer from 1 to 3, and r is an integer from 0 to 3.

The above-mentioned A is selected from the group consisting of, for example, hydrogen, halogen, a $C_{1-3}$ alkyl group, a halogenated $C_{1-3}$ alkyl group, an alkoxy group represented by OR (wherein R is the group defined above), an aryl group, a substituted aryl group by halogenation, a $C_{1-9}$ alkoxycarbonyl group, a $C_{1-9}$ alkylcarbonyloxy group, a $C_{1-12}$ aryloxycarbonyl group, a $C_{1-12}$ arylcarbonyloxy group and a substituted derivative thereof, a $C_{1-12}$ arylcarbamoyl group, and a $C_{1-12}$ arylcarbonylamino group and a substituted derivative thereof When there are plural As, they may be the same or different. The above-mentioned B is selected from the group consisting of, for example, halogen, a $C_{1-3}$ alkyl group, a halogenated $C_{1-3}$ alkyl group, a phenyl group and a substituted phenyl group and when there are plural Bs, they may be the same or different. A substituent on a phenyl ring of the substituted phenyl group can be, for example, halogen, a $C_{1-3}$ alkyl group, a halogenated $C_{1-3}$ alkyl group or a combination thereof. The t is an integer from 0 to 4, and the z is an integer from 0 to 3.

Among the repeating units of the polyamide or polyester represented by the chemical formula (16) above, the repeating unit represented by the general chemical formula (17) below is preferable.

(17)

In the chemical formula (17), A, B and Y are those defined by the chemical formula (16), and v is an integer from 0 to 3, preferably is an integer from 0 to 2. Although each of x and y is 0 or 1, not both of them are 0.

Though there is no specific limitation on the molecular weight of the polyamide or the polyester, a preferred range for the weight-average molecular weight (Mw) is from 20,000 to 500,000, more preferably from 50,000 to 200,000. When the weight-average molecular weight is in this range, a sufficient strength is obtained. The thus formed optical film is resistant to crack which is caused by stretching, deformation or the like. Moreover, as the polyamide or the polyester will not be gelled, they will be dissolved well in a solvent.

An example of the polyimide as a polymer material that can be used in the present invention and has a photoelastic coefficient of at least $60 \times 10^{-8}$ cm$^2$/N is polyimide described in JP 2000-511296 A. It contains a condensation polymer of 9,9-bis(aminoaryl)fluorene and an aromatic tetracarboxylic dianhydride, and also contains at least one repeating unit represented by the chemical formula (18) below.

(18)

In the above chemical formula (18), $R^3$ to $R^6$ are at least one substituent selected independently from the group consisting of hydrogen, halogen, a phenyl group, a phenyl group substituted with 1 to 4 halogen atoms or a $C_{1-10}$ alkyl group, and a $C_{1-10}$ alkyl group. Preferably, $R^3$ to $R^6$ are at least one substituent selected independently from the group consisting of halogen, a phenyl group, a phenyl group substituted with 1 to 4 halogen atoms or a $C_{1-10}$ alkyl group, and a $C_{1-10}$ alkyl group.

In the above chemical formula (18), D is, for example, a $C_{6-20}$ quadrivalent aromatic group, and preferably is a pyromellitic group, a polycyclic aromatic group, a derivative of a polycyclic aromatic group or a group represented by the chemical formula (19) below.

(19)

In the chemical formula (19) above, J is, for example, a covalent bond, a $C(R^7)_2$ group, a CO group, an O atom, an S atom, an $SO_2$ group, an $Si(C_2H_5)_2$ group or an $NR^8$ group. When there are plural Js, they may be the same or different. Also, w is an integer from 1 to 10. $R^7$s independently are hydrogen or $C(R^9)_3$. $R^8$ is hydrogen, an alkyl group having from 1 to about 20 carbon atoms or a $C_{6-20}$ aryl group, and when there are plural $R^8$s, they may be the same or different. $R^9$s independently are hydrogen, fluorine or chlorine.

The above-mentioned polycyclic aromatic group may be, for example, a quadrivalent group derived from naphthalene, fluorene, benzofluorene or anthracene. Further, a substituted derivative of the above-mentioned polycyclic aromatic group may be the above-mentioned polycyclic aromatic group substituted with at least one group selected from the group consisting of, for example, a $C_{1-10}$ alkyl group, a fluorinated derivative thereof and halogen such as F and Cl.

Other than the above, homopolymer whose repeating unit is represented by the general chemical formula (20) or (21) below or polyimide whose repeating unit is represented by the general chemical formula (22) below disclosed in JP 8(1996)-511812 A may be used, for example. The polyimide represented by the chemical formula (22) below is a preferable mode represented by the chemical formula (20).

(20)

(21)

(22)

In the above general chemical formulae (20) to (22), G and G' each are a group selected independently from the group consisting of, for example, a covalent bond, a $CH_2$ group, a $C(CH_3)_2$ group, a $C(CF_3)_2$ group, a $C(CX_3)_2$ group (wherein X is halogen), a CO group, an O atom, an S atom, an $SO_2$ group, an $Si(CH_2CH_3)_2$ group and an $N(CH_3)$ group.

In the above chemical formulae (20) and (22), L is a substituent, and d and e indicate the number of substitutions therein. L is, for example, halogen, a $C_{1-3}$ alkyl group, a halogenated $C_{1-3}$ alkyl group, a phenyl group or a substituted phenyl group, and when there are plural Ls, they may be the same or different. The above-mentioned substituted phenyl group may be, for example, a substituted phenyl group having at least one substituent selected from the group consisting of halogen, a $C_{1-3}$ alkyl group and a halogenated $C_{1-3}$ alkyl group. Also, the above-mentioned halogen may be, for example, fluorine, chlorine, bromine or iodine. The above-described d is an integer from 0 to 2, and e is an integer from 0 to 3.

In the above chemical formulae (20) to (22), Q is a substituent, and f indicates the number of substitutions therein. Q may be, for example, an atom or a group selected from the group consisting of hydrogen, halogen, an alkyl group, a substituted alkyl group, a nitro group, a cyano group, a thioalkyl group, an alkoxy group, an aryl group, a substituted aryl group, an alkyl ester group and a substituted alkyl ester group and, when there are plural Qs, they may be the same or different. The above-mentioned halogen may be, for example, fluorine, chlorine, bromine or iodine. The above-mentioned substituted alkyl group may be, for example, a halogenated alkyl group. Also, the above-mentioned substituted aryl group may be, for example, a halogenated aryl group. Here, f is an integer from 0 to 4, and g and h respectively are an integer from 0 to 3 and an integer from 1 to 3. Furthermore, it is preferable that g and h are larger than 1.

In the above chemical formula (21), $R^{10}$ and $R^{11}$ are groups selected independently from the group consisting of hydrogen, halogen, a phenyl group, a substituted phenyl group, an alkyl group and a substituted alkyl group. It is particularly preferable that $R^{10}$ and $R^{11}$ independently are a halogenated alkyl group.

In the above chemical formula (22), $M^1$ and $M^2$ may be the same or different and, for example, halogen, a $C_{1-3}$ alkyl group, a halogenated $C_{1-3}$ alkyl group, a phenyl group or a substituted phenyl group. The above-mentioned halogen may be, for example, fluorine, chlorine, bromine or iodine. The above-mentioned substituted phenyl group may be, for example, a substituted phenyl group having at least one substituent selected from the group consisting of halogen, a $C_{1-3}$ alkyl group and a halogenated $C_{1-3}$ alkyl group.

A specific example of the polyimide includes polyimide represented by the chemical formula (23) below.

(23)

Moreover, polyimide other than the above-described one may be, for example, copolymer obtained suitably by copolymerizing acid dianhydride and diamine other than the above-noted skeleton.

The above-mentioned acid dianhydride may be, for example, aromatic tetracarboxylic dianhydride. The aromatic tetracarboxylic dianhydride may be, for example, pyromellitic dianhydride, benzophenone tetracarboxylic dianhydride, naphthalene tetracarboxylic dianhydride, heterocyclic aromatic tetracarboxylic dianhydride or 2,2'-substituted biphenyl tetracarboxylic dianhydride.

The pyromellitic dianhydride may be, for example, pyromellitic dianhydride, 3,6-diphenyl pyromellitic dianhydride, 3,6-bis(trifluoromethyl)pyromellitic dianhydride, 3,6-dibromopyromellitic dianhydride or 3,6-dichloropyromellitic dianhydride. The benzophenone tetracarboxylic dianhydride may be, for example, 3,3',4,4'-benzophenone tetracarboxylic dianhydride, 2,3,3',4'-benzophenone tetracarboxylic dianhydride or 2,2',3,3'-benzophenone tetracarboxylic dianhydride. The naphthalene tetracarboxylic dianhydride may be, for example, 2,3,6,7-naphthalene-tetracarboxylic dianhydride, 1,2,5,6-naphthalene-tetracarboxylic dianhydride or 2,6-dichloro-naphthalene-1,4,5,8-tetracarboxylic dianhydride. The heterocyclic aromatic tetracarboxylic dianhydride may be, for example, thiophene-2,3,4,5-tetracarboxylic dianhydride, pyrazine-2,3,5,6-tetracarboxylic dianhydride or pyridine -2,3,5,6-tetracarboxylic dianhydride. The 2,2'-substituted biphenyl tetracarboxylic dianhydride may be, for example, 2,2'-dibromo-4,4',5,5'-biphenyl tetracarboxylic dianhydride, 2,2'-dichloro-4,4',5,5'-biphenyl tetracarboxylic dianhydride or 2,2'-bis(trifluoromethyl)-4,4',5,5'-biphenyl tetracarboxylic dianhydride.

Other examples of the aromatic tetracarboxylic dianhydride may include 3,3',4,4'-biphenyl tetracarboxylic dianhydride, bis(2,3-dicarboxyphenyl)methane dianhydride, bis(2,5,6-trifluoro-3,4-dicarboxyphenyl)methane dianhydride, 2,2-bis(3,4-dicarboxyphenyl)-1,1,1,3,3,3-hexafluoropropane dianhydride, 4,4'-(3,4-dicarboxyphenyl)-2,2-diphenylpropane dianhydride, bis(3,4-dicarboxyphenyl)ether dianhydride, 4,4'-oxydiphthalic dianhydride, bis(3,4-dicarboxyphenyl)sulfonic dianhydride, (3,3',4,4'-diphenylsulfone tetracarboxylic dianhydride), 4,4'-[4,4'-isopropylidene-di(p-phenyleneoxy)]bis(phthalic dianhydride), N,N-(3,4-dicarboxyphenyl)-N-methylamine dianhydride and bis(3,4-dicarboxyphenyl)diethylsilane dianhydride.

Among the above, the aromatic tetracarboxylic dianhydride preferably is 2,2'-substituted biphenyl tetracarboxylic dianhydride, more preferably is 2,2'-bis(trihalomethyl)-4,4',5,5'-biphenyl tetracarboxylic dianhydride, and further preferably is 2,2'-bis(trifluoromethyl)-4,4',5,5'-biphenyl tetracarboxylic dianhydride.

The above-mentioned diamine may be, for example, aromatic diamine. Specific examples thereof include benzenediamine, diaminobenzophenone, naphthalenediamine, heterocyclic aromatic diamine and other aromatic diamines.

The benzenediamine may be, for example, diamine selected from the group consisting of benzenediamines such as o-, m- and p-phenylenediamine, 2,4-diaminotoluene, 1,4-diamino-2-methoxybenzene, 1,4-diamino-2-phenylbenzene and 1,3-diamino-4-chlorobenzene. Examples of the diaminobenzophenone may include 2,2'-diaminobenzophenone and 3,3'-diaminobenzophenone. The naphthalenediamine may be, for example, 1,8-diaminonaphthalene or 1,5-diaminonaphthalene. Examples of the heterocyclic aromatic diamine may include 2,6-diaminopyridine, 2,4-diaminopyridine and 2,4-diamino-S-triazine.

Further, other than the above, the aromatic diamine may be 4,4'-diaminobiphenyl, 4,4'-diaminodiphenyl methane, 4,4'-(9-fluorenylidene)-dianiline, 2,2'-bis(trifluoromethyl)-4,4'-diaminobiphenyl, 3,3'-dichloro-4,4'-diaminodiphenyl methane, 2,2'-dichloro-4,4'-diaminobiphenyl, 2,2',5,5'-tetrachlorobenzidine, 2,2-bis(4-aminophenoxyphenyl)propane, 2,2-bis(4-aminophenyl)propane, 2,2-bis(4-aminophenyl)-1,1,1,3,3,3-hexafluoropropane, 4,4'-diamino diphenyl ether, 3,4'-diamino diphenyl ether, 1,3-bis(3-aminophenoxy)benzene, 1,3-bis(4-aminophenoxy)benzene, 1,4-bis(4-aminophenoxy)benzene, 4,4'-bis(4-aminophenoxy)biphenyl, 4,4'-bis(3-aminophenoxy)biphenyl, 2,2-bis[4-(4-aminophenoxy)phenyl]propane, 2,2-bis[4-(4-aminophenoxy)phenyl]-1,1,1,3,3,3,-hexafluoropropane, 4,4'-diamino diphenyl thioether or 4,4'-diaminodiphenylsulfone.

Though there is no specific limitation on the molecular weight of these polyimides, it is preferable that the weight-average molecular weight (Mw) is from 1,000 to 1,000,000, or more preferably from 2,000 to 500,000.

For the polymer material that is used for a birefringent optical film of the present invention and that has a photoelastic coefficient of at least $60 \times 10^{-8}$ cm$^2$/N, the above-mentioned polyaryletherketone, polyamide, polyester, polyimide or the like can be used alone, or they can be used as a mixture of at least two kinds of polymers having different polyfunctional groups, for example, a mixture of polyaryletherketone and polyamide.

Moreover, the polymer solution may contain other resins as long as the orientation of the polymer does not drop considerably. Such resins can be, for example, resins for general purpose use, engineering plastics, thermoplastic resins and thermosetting resins.

The resins for general purpose use can be, for example, polyethylene (PE), polypropylene (PP), polystyrene (PS), polymethyl methacrylate (PMMA), an ABS resin, an AS resin or the like. The engineering plastics can be, for example, polyacetate (POM), polycarbonate (PC), polyamide (PA: nylon), polyethylene terephthalate (PET), polybutylene terephthalate (PBT) or the like. The thermoplastic resins can be, for example, polyphenylene sulfide (PPS), polyethersulfone (PES), polyketone (PK), polyimide (PI), polycyclohexanedimethanol terephthalate (PCT), polyarylate (PAR), liquid crystal polymers (LCP) or the like. The thermosetting resins can be, for example, epoxy resins, phenolic novolac resins or the like.

When the above-described other resins are blended in the polymer solution as mentioned above, the blend amount ranges, for example, from 0 wt % to 50 wt %, preferably from 0 wt % to 30 wt %, with respect to the polymer, through the blend rate is not limited specifically as long as there occurs no considerable degradation in the orientation.

In the polymer material solution, various known additives such as a stabilizer, a plasticizer, metal and the like further may be blended as necessary.

The solvent of the polymer material solution is not particularly limited as long as it can dissolve the polymer, and can be selected suitably according to the kind of polymer. Examples thereof include halogenated hydrocarbons such as chloroform, dichloromethane, carbon tetrachloride, dichloroethane, tetrachloroethane, trichloroethylene, tetrachloroethylene, chlorobenzene and orthodichlorobenzene; phenols such as phenol and parachlorophenol; aromatic hydrocarbons such as benzene, toluene, xylene, methoxybenzene and 1,2-dimethoxybenzene; ketone-based solvents such as acetone, methyl ethyl ketone, methyl isobutyl ketone, cyclohexanone, cyclopentanone, 2-pyrrolidone and N-methyl-2-pyrrolidone; ester-based solvents such as ethyl acetate and butyl acetate; alcohol-based solvents such as t-butyl alcohol, glycerin, ethylene glycol, triethylene glycol, ethylene glycol monomethyl ether, diethylene glycol dimethyl ether, propylene glycol, dipropylene glycol and 2-methyl-2,4-pentanediol; amide-based solvents such as dimethylformamide and dimethylacetamide; nitrile-based solvents such as acetonitrile and butyronitrile; ether-based solvents such as diethyl ether, dibutyl ether and tetrahydrofuran; or carbon disulfide, ethyl cellosolve or butyl cellosolve. These solvents may be used alone or in combination of two or more.

The polymer material other than the polymer material that is used for the birefringent optical film and has a photoelastic coefficient of at least $60 \times 10^{-8}$ cm$^2$/N is preferably thermoplastic from an aspect of the manufacturing process including a stretching step. Any polymer material having a photoelastic coefficient satisfying the numerical formula (1) can be selected suitably. The polymer material may be acetate resin such as triacetylcellulose, polyester resin, polyethersulfone resin, polysulfone resin, polycarbonate resin, polyamide resin, polyimide resin, polyolefin resin, acrylic resin, polynorbornene resin, cellulose resin, polyarylate resin, polystyrene resin, polyvinylalcohol resin, polyvinylchloride resin, polyvinylidene chloride resin, polyacrylic resin, a mixture of a thermoplastic resin whose side chain has a substituted or unsubstituted imide group and a thermoplastic resin whose side chain has a substituted or unsubstituted phenyl group and a nitrile group, and a liquid crystal polymer.

When the birefringent optical film of the present invention is the laminate prepared by laminating the polymer layers through an adhesive or a pressure-sensitive adhesive, the adhesive or the pressure-sensitive adhesive can be selected suitably without any specific limitations, and the material is based on polymers selected from, for example, an acrylic polymer, a silicone-based polymer, polyester, polyurethane, polyamide, polyvinyl ether, a vinyl acetate/vinyl chloride copolymer, denatured polyolefin, a epoxy-based polymer, a fluorine-based polymer, and polymers based on a natural rubber or a synthetic rubber. Specifically preferred materials among them have excellent optical transparency, weather resistance and heat resistance, and also an adhesive property including appropriate wettability, cohesiveness, and stickiness.

A laminate including a birefringent optical film of the present invention and a polarizer can be used as an elliptically polarizing plate.

An elliptically polarizing plate of the present invention can be manufactured by, for example, 1) forming a birefringent optical film of the present invention on a base and transcribing it for laminating on a polarizer or a polarizing plate through an adhesive or pressure-sensitive adhesive; 2) forming a birefringent optical film of the present invention on a base and laminating the film on a polarizing plate through an adhesive or pressure-sensitive adhesive; 3) preparing a birefringent optical film of the present invention as a laminate with a base, and using it as a protective layer for laminating an additional polarizer through an adhesive or pressure-sensitive adhesive; and 4) using a polarizer as a base, and forming directly on the polarizer a birefringent optical film of the present invention.

There is no specific limitation on the adhesive or the pressure-sensitive adhesive, but transparent adhesives or pressure-sensitive adhesives based on acrylic substances, silicone, polyester, polyurethane, polyether and rubbers can be used. From an aspect of preventing deterioration in the optical properties of the optical films or the like, it is preferable that the adhesive or pressure-sensitive adhesive does not require a high-temperature, long-term processing steps for curing or drying. It is also preferable that the adhesive or pressure-sensitive adhesive has a low hygroscopicity and excellent heat resistance when used for a liquid crystal display or the like, since such an adhesive or pressure-sensitive adhesive contributes to preventing foaming and peeling caused by applied heat and humidity, preventing the liquid crystal cell from warping, and providing excellent quality and durability.

Though there is no specific limitation, the polarizing plate may have a basic structure where a transparent protective film as a protective layer is laminated on at least one surface of a polarizer, for example, through at least one adhesive layer.

The polarizer is not limited specifically as long as it transmits linearly-polarized light when natural light enters. A suitable polarizer is formed by subjecting a film formed of vinyl alcohol-based polymer, for example, polyvinyl alcohol or partially-formalized polyvinyl alcohol, to suitable treatments such as a dyeing treatment by a dichroic material containing iodine or a dichroic dye, a stretching treatment and a cross-linking treatment in a suitable order and manner. It also may be possible to use a polarizing film formed of polyene oriented films such as dehydrated polyvinyl alcohol and dehydrochlorinated polyvinyl chloride. Among them, polyvinyl alcohol-based film prepared by adsorbing iodine or a dichroic dye and orienting the film is used preferably. In particular, a film having excellent light transmittance and polarization degree is preferable. The thickness of the polarizer generally is 1 µm to 80 µm, though it is not limited to this.

Though there is no specific limitation on the material for the transparent protective film, it is preferable that the film is made of polymers or the like having excellent transparency, mechanical strength, thermal stability, waterproof or the like. Examples of the polymer include, for example, acetate resin, polyethersulfone resin, polysulfone resin, polycarbonate resin, polyamide resin, polyimide resin, polyolefin resin, acrylic resin, polynorbornene resin, cellulose resin, polyarylate resin, polystyrene resin, polyvinyl alcohol resin, polyvinyl chloride resin, polyvinylidene chloride resin, polyacrylic resin, and a mixture of a thermoplasitc resin whose side chain has a substituted or unsubstituted imide group and a thermoplastic resin whose side chain has a substituted or unsubstituted phenyl group and a nitrile group. A specific example of the acetate resin is triacetyl cellulose. A specific example of the mixed thermoplastic resin is described in JP 2001-343529 A (WO01/37007). It is a resin composition containing alternating copolymer containing isobutene and N-methyl maleimide and a copolymer of acrylonitrile/styrene. Considering the polarizing property, durability or the like, a triacetyl cellulose film having a surface saponified with alkali or the like is preferred. Though there is no specific limitation on thickness of the transparent protective film, the thickness is preferably not more than 500 µm from an aspect of decreasing the thickness of the polarizing plate. More preferably, the thickness is in a range of 5 µm to 300 µm, and further preferably from 5 µm to 150 µm. When transparent protective films are formed on both surfaces of the polarizer, the films can contain polymers different from each other.

It is preferable that the protective layer is colorless. More specifically, a retardation value (Rth) of the film in its thickness direction as represented by the equation below preferably ranges from −90 nm to +75 nm, more preferably ranges from −80 nm to +60 nm, and particularly preferably ranges from −70 nm to +45 nm. When the retardation value is within the range of −90 nm to +75 nm, coloring (optical coloring) of the polarizing plate, which is caused by the protective film, can be solved sufficiently. In the equation below, nx, ny and nz are equivalent to those described above, and d indicates the thickness of this film.

$$Rth=\{[(nx+ny)/2]-nz\}\cdot d$$

As long as the object of the present invention is not missed, a transparent protective film may be subjected to a hard coating treatment, an antireflection treatment, treatments for anti-sticking, diffusion and anti-glaring and the like.

The hard coating treatment aims to prevent scratches on the surfaces of the polarizing plate, and is a treatment of, for example, providing a hardened coating film that is formed of a curable resin and has excellent hardness and smoothness onto a surface of the transparent protective film. The curable resin can be, for example, ultraviolet-curing resins of silicone base, urethane base, acrylic, and epoxy base. The treatment can be carried out by a known method. The antireflection treatment aims to prevent reflection of external light on the surface of the polarizing plate, and can be carried out by forming a known antireflection film or the like. The anti-sticking treatment can prevent adjacent layers from sticking to each other. The diffusion treatment can, for example, diffuse light passing through a polarizing plate so as to enlarge and compensate the viewing angle. The anti-glare treatment can prevent, for example, reflection of external light on the polarizing plate surface from hindering visibility of light transmitted through the polarizing plate. These treatments can be carried out, for example, by providing microscopic asperities on a surface of a transparent protective film. Such microscopic asperities can be provided, for example, by roughening the surface by sand-blasting or embossing, or by blending transparent fine particles in the above-described transparent resin when forming the transparent protective layer.

The above-described transparent fine particles may be silica, alumina, titania, zirconia, stannic oxide, indium oxide, cadmium oxide, antimony oxide or the like. Other than the above, inorganic fine particles having an electrical conductivity or organic fine particles comprising, for example, crosslinked or uncrosslinked polymer particles can be used as well. The average particle diameter of the transparent fine particles ranges, for example, from 0.5 µm to 20 µm. In general, a blend ratio of the transparent fine particles preferably ranges from 2 to 70 parts by weight, and more preferably ranges from 5 to 50 parts by weight with respect to 100 parts by weight of the above-described transparent resin, though there is no specific limitation.

An anti-glare layer in which the transparent fine particles are blended can be used as the transparent protective layer itself or provided as a coating layer applied onto the transparent protective layer surface. Furthermore, the anti-glare layer also can function as a diffusion layer. The antireflection layer, the anti-sticking layer, the diffusion layer and the anti-glare layer mentioned above can be laminated on the polarizing plate, as an optical layer comprising sheets of these layers, separately from the transparent protective layer.

The polarizer and the transparent protective film can be bonded to each other directly or indirectly, for example, with a suitable adhesive comprising, for example, an acrylic polymer and a vinyl alcohol-based polymer without any specific limitation. It is preferable that the adhesive contains further a water-soluble crosslinking agent of a vinyl alcohol-based polymer such as boric acid, borax, glutaraldehyde, melamine and oxalic acid so as to provide a polarizing plate being resistant to peeling under the influence of moisture or heat and having excellent light transmittance and a polarization degree. A layer of the adhesives can be formed, for example, by coating an aqueous solution of the adhesive and drying. During preparation of the aqueous solution, other additives or catalysts such as acids can be blended as required. Among them, a polyvinyl alcohol-based adhesive is preferred from an aspect of its excellent adhesiveness with a PVA film.

The birefringent optical film and the elliptically polarizing plate of the present invention can be used in combination with, for example, various retardation plates, diffusion-control films, and brightness-enhancement films. A retardation film can be prepared by, for example, stretching a polymer uniaxially or biaxially, subjecting a polymer to Z-axis orientation, or coating a liquid crystal polymer on a base. The diffusion-control films can use diffusion, scattering, and refraction for controlling viewing angles, or for controlling glaring and scattered light that will affect definition. The brightness-enhancement film may include a λ/4 plate and a selective reflector of a cholesteric liquid crystal, and a scattering film using an anisotropic scatter depending on the polarization direction. Also, a wire grid polarizer can be used in the combination.

It is preferable that optical films or elliptically polarizing plates of the present invention are used for manufacturing various liquid crystal displays or the like. Other optical layers such as polarizing plates, reflectors, transflectors, and brightness-enhancement films can be laminated additionally as required, for example, through the adhesive or pressure-sensitive adhesive. One or plural optical layer(s) mentioned above can be laminated.

A reflective polarizing plate can be prepared by additionally laminating the reflector on an elliptically polarizing plate of the present invention. In general, such a reflective polarizing plate is arranged on a backside of a liquid crystal cell in order to make a liquid crystal display to reflect incident light from a visible side (display side). The reflective polarizing plate has some merits, for example, assembling of light sources such as backlight can be omitted, and the liquid crystal display can be thinned further.

The reflective polarizing plate can be formed in any known manner such as forming a reflector of metal or the like on one surface of the elliptically polarizing plate. For example, a transparent protective film of the polarizing plate is prepared by matting one surface (surface to be exposed) if required. On this surface, a foil comprising a reflective metal such as aluminum or a deposition film is applied to form a reflector.

An additional example of a reflective polarizing plate includes the above-mentioned transparent protective film having a surface with microscopic asperities, and also a reflecting layer corresponding to the microscopic asperities. The reflecting layer having a microscopic asperity surface diffuses incident light irregularly so that directivity and glare can be prevented and irregularity in color tones can be controlled.

The reflector can be formed by attaching a metal directly on a surface of a transparent protective film in any conventional and appropriate methods including deposition such as vacuum deposition, and plating such as ion plating and sputtering.

The above-mentioned reflective polarizing plate is manufactured by directly forming the reflector on a protective layer of the elliptically polarizing plate. Alternatively, the reflector can be used as a reflecting sheet formed by providing a reflecting layer onto a proper film similar to the transparent protective film used for the protective layer. Since a typical reflecting layer of a reflector is made of a metal, it is preferably used in a state coated with a film, a polarizing plate or the like in order to prevent a reduction of the reflection rate due to oxidation, and furthermore, the initial reflection rate is maintained for a long period.

A semitransparent polarizing plate is provided by replacing the reflector in the above-mentioned reflective polarizing plate by a transflector, and it is exemplified by a half mirror that reflects and transmits light at the reflector.

In general, such a semitransparent polarizing plate is arranged on a backside of a liquid crystal cell. In a liquid crystal display comprising the semitransparent polarizing plate, incident light from the visible side (display side) is reflected to display an image when a liquid crystal display is used in a relatively bright atmosphere, while in a relatively dark atmosphere, an image is displayed by using a built-in light source such as a backlight on the backside of the semitransparent polarizing plate. In other words, the semitransparent polarizing plate can be used to form a liquid crystal display that can save energy for a light source such as a backlight under a bright atmosphere, while a built-in light source can be used under a relatively dark atmosphere.

A suitable example of the brightness-enhancement film is selected from a multilayer thin film of a dielectric or a multilayer lamination of thin films with varied refraction aeolotropy (e.g., trade name: D-BEF manufactured by 3M Co.) that transmits linearly polarized light having a predetermined polarization axis while reflecting other light, and a cholesteric liquid crystal layer, more specifically, an oriented film of a cholesteric liquid crystal polymer or an oriented liquid crystal layer fixed onto a supportive substrate (e.g., trade name: PCF 350 manufactured by Nitto Denko Corporation, or trade name: Transmax manufactured by Merck and Co., Inc.) that reflects either clockwise or counterclockwise circularly polarized light while transmitting other light.

An optical member comprising a laminate of at least two optical layers can be formed by a method of laminating layers separately in a certain order for manufacturing a liquid crystal display or the like. Since an optical member that has been laminated previously has excellent stability in quality and assembling operability, efficiency in manufacturing a liquid crystal display can be improved. Any appropriate adhesives such as a pressure-sensitive adhesive layer can be used for laminating the polarizing plate and optical layers. The adhesive or pressure-sensitive adhesive can contain microparticles for diffusing light. The layer of the adhesive or pressure-sensitive adhesive can be provided as required.

When a surface of a layer of an adhesive or a pressure-sensitive adhesive on a surface of the elliptically polarizing plate is exposed, preferably, the adhesive layer is covered with a separator until the time the pressure-sensitive adhesive layer is used so that contamination will be prevented. The separator can be formed by coating, on a membrane film such as the transparent protective film, a layer including at least one layer of a peeling agent containing silicone, long-chain alkyl, fluorine, molybdenum sulfide or the like as required.

The above-described layers such as a birefringent optical film, a polarizer, a transparent protective film, a layer of an adhesive or a pressure-sensitive adhesive, can have ultraviolet absorption power as a result of treatment with an ultraviolet absorber such as an salicylate compound, a benzophene-based compound, a benzotriazole compound, a cyanoacrylate compound, and a nickel complex salt compound.

The birefringent optical film and the elliptically polarizing plates of the present invention can be used preferably for manufacturing various devices such as liquid crystal displays. For example, various types of liquid crystal displays such as reflective, semitransparent, or transparent-reflective liquid crystal displays can be provided by arranging any of the above-described various polarizing plates or the like on at least one surface of a liquid crystal cell.

When polarizing plates or optical members are arranged on both surfaces of a liquid crystal panel, the polarizing plates or the optical members on the surfaces can be the same or different type. Moreover, for forming a liquid crystal display, a prism array sheet, a lens array sheet, an optical diffuser and an appropriate member such as a backlight can be arranged at proper positions as required.

The birefringent optical films and elliptically polarizing plates of the present invention can be used preferably for optical compensation in various liquid crystal displays, and they can be used especially preferably as viewing angle compensation films for vertical alignment (VA) mode liquid crystal displays that require increased Rth values for the viewing angle compensation. A birefringent optical film of the present invention, which has a high orientation, can provide a wide viewing angle even when it is used alone. Furthermore, since a birefringent optical film of the present invention will have, in the retardation value, a small fluctuation that occurs corresponding to external force caused by dimensional change or the like of the polarizer under a severe condition applied with heat and/or humidity. As a result, irregularities in the contrast in the display device can be decreased considerably so as to maintain the display quality.

EXAMPLES

Examples of the present invention and Comparative Examples will be described below, though the present invention is not limited to the Examples. The retardation values and the photoelastic coefficients were measured respectively in the following manner.

(Retardation Value)

A retardation value at a wavelength of $\lambda=590$ was measured with an automatic birefringence analyzer (trade name: KOBRA-21ADH manufactured by Oji Scientific Instruments).

(Photoelastic Coefficient)

An in-plane retardation value ($\Delta$nd) of the optical film was measured while applying stress to the optical film. The value was divided by a thickness d of the optical film so as to obtain $\Delta$n. By calculating $\Delta$n corresponding to various stresses, a stress-$\Delta$n curve was drawn, whose inclination was determined as a photoelastic coefficient.

Example 1

Polyimide of Mw=120,000, which was synthesized from 2,2-bis(3,4-dicarboxyphenyl)hexafluoropropane dianhydride (6FDA) and 2,2'-bis(trifluoromethyl)-4,4'-diaminobiphenyl (PFMB or TFMB), was dissolved in methyl isobutyl ketone so as to prepare a 15 wt % solution. The solution was coated on a thermoplastic polymer base 40 μm in thickness (trade name: ZEONOR manufactured by Nippon Zeon Co., Ltd.), and subsequently dried at 150° C., thereby obtaining a birefringent optical film of a laminate having an optical anisotropy of nx=ny>nz. In a measurement, the polymer base had a photoelastic coefficient of $4\times10^{-8}$ cm$^2$/N, while the 6FDA-PFMB layer (thickness d=7.2 μm) had a photoelastic coefficient of $60\times10^{-8}$ cm$^2$/N. Therefore, a calculated value of $\Sigma(Cn\times Wn)$ of the thus obtained birefringent optical film was $18\times10^{-8}$ cm$^2$/N, and a measured value of the photoelastic coefficient of the same optical film was $21\times10^{-8}$ cm$^2$/N. In the 6FDA-PFMB layer, $\Delta$nd was 0.3 nm, Rth was 251 nm, and $\Delta$nxz (=nx−nz) was 0.035.

Example 2

A polyimide solution of Example 1 was coated on a thermoplastic polymer base 40 μm in thickness (trade name: ZEONOR manufactured by Nippon Zeon Co., Ltd.), and subsequently stretched uniaxially by 5% in the longitudinal direction while being dried at 150° C. so as to obtain a birefringent optical film of a laminate having an optical anisotropy of nx>ny>nz. In a measurement, the polymer base had a photoelastic coefficient value of $4\times10^{-8}$ cm$^2$/N, and the thickness was 38 μm. The 6FDA-PFMB layer had a photoelastic coefficient of $98\times10^{-8}$ cm$^2$/N, and the thickness was 6.5 μm. Therefore, a calculated value of $\Sigma(Cn\times Wn)$ of the thus obtained birefringent optical film was $18\times10^{-8}$ cm$^2$/N, and a measured value of the photoelastic coefficient of the same optical film was $20\times10^{-8}$ cm$^2$/N. In the 6FDA-PFMB layer, $\Delta$nd was 53 nm, Rth was 275 nm, and $\Delta$nxz was 0.042.

Example 3

A polyimide solution of Example 1 and a thermoplastic polymer of Example 1 (trade name: ZEONOR manufactured by Nippon Zeon Co., Ltd.) were dissolved in a ratio of 1:8 in methyl isobutyl ketone so as to prepare a 30 wt % of polymer mixture solution. This solution was coated on a PET film, dried at 150° C., and subsequently peeled off from the PET film so as to obtain a birefringent optical film having a thickness of 45 μm. The polyimide had a photoelastic coefficient of $98\times10^{-8}$ cm$^2$/N, and the thermoplastic polymer had a photoelastic coefficient of $4\times10^{-8}$ cm$^2$/N. Therefore, a calculated value $\Sigma(Cn\times Wn)$ of the thus obtained birefringent optical film was $14\times10^{-8}$ cm$^2$/N, and a measured value of a photoelastic coefficient of the same optical film was $15\times10^{-8}$ cm$^2$/N, where $\Delta$nd was 1 nm and Rth was 180 nm.

Comparative Example 1

A polycarbonate film (thickness: 60 μm) was stretched biaxially by 8% in the longitudinal direction and by 5% in the transverse direction at 165° C. so as to obtain a birefringent optical film having an optical anisotropy of nx>ny>nz. The film had a photoelastic coefficient of $88\times10^{-8}$ cm$^2$/N, where d=52 μm, $\Delta$nd=55 nm, Rth=245 nm, and $\Delta$nxz=0.0047.

Comparative Example 2

A film 100 μm in thickness (trade name: ARTRON) manufactured by JSR Corporation was subjected to a fixed-end transverse stretching by 20% at 175° C., thereby obtaining a birefringent optical film having an optical anisotropy of nx>ny>nz. The film had a photoelastic coefficient of $5\times10^{-8}$ cm$^2$/N, where d=83 μm, $\Delta$nd=49 nm, Rth=118 nm, and $\Delta$nxz=0.0014.

Each of the thus obtained birefringent optical films was bonded to a polarizing plate (trade name: SEG1425DU) manufactured by Nitto Denko Corporation through a pressure-sensitive adhesive so that the retardation axis of the optical film and the absorption axis of the polarizing plate cross at right angles, thereby manufacturing an elliptically polarizing plate. The elliptically polarizing plate was used for measurement of the viewing angle property and for a heat exposure test.

(Measurement of Viewing Angle Property)

The elliptically polarizing plate was bonded onto one surface of a commercially available VA mode cell through a pressure-sensitive adhesive so that the optical film faces the cell, while the other surface of the VA mode cell was bonded with a polarizing plate alone through a pressure-sensitive adhesive so that the elliptically polarizing plate and the absorption axis cross each other at right angles, thereby a liquid crystal display was manufactured. The viewing angle property of the liquid crystal display was measured by using a meter (trade name: EZContrast) manufactured by ELDIM. The viewing angle property was evaluated as 'A' when an omnidirectional contrast was 10 or more, while 'B' indicates that the omnidirectional contrast was lower than 10. The results are shown in the following Table 1.

(Heat Exposure Test)

Figure 1:
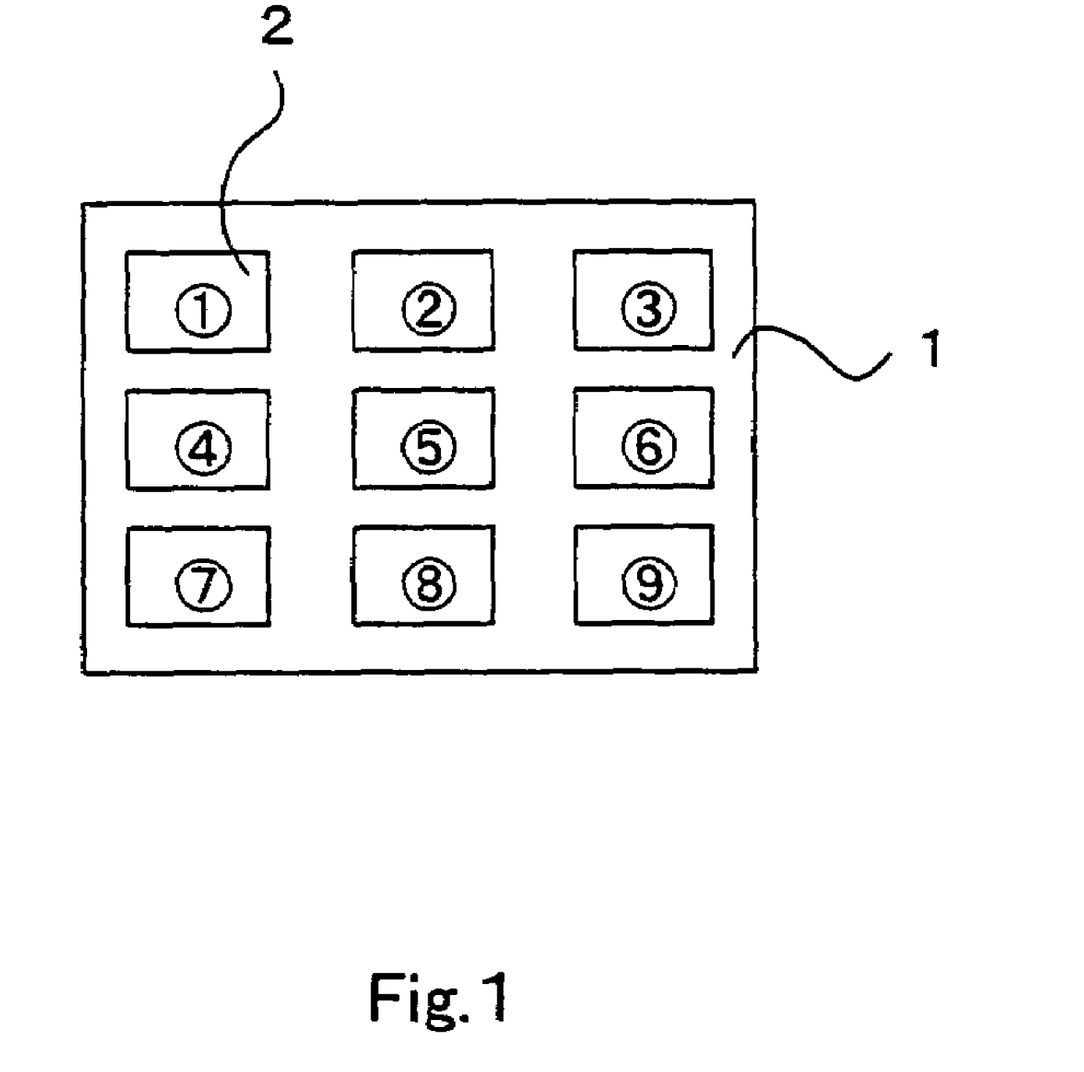
FIG. 1 shows brightness measurement points on a sample used for a heat exposure test regarding a birefringent optical film of the present invention.

Each of the elliptically polarizing plates was bonded to one surface of a glass sheet (170 mm×140 mm) through a pressure-sensitive adhesive so that the optical film faces the glass sheet and the absorption axis of the elliptically polarizing plate forms an angle of 45° with respect to the long side of the glass sheet, while the other surface of the glass sheet was provided with a polarizing plate bonded alone through a pressure-sensitive adhesive so that the elliptically polarizing plate and the absorption axis cross each other at right angles. Thereby, a sample for heat exposure test was manufactured. This sample was supplied into a thermostat at 80° C. for 12 hours. Subsequently, light transmittance at nine measurement points set on the sample surface was measured with a brightness meter. The values were applied to the following equation (i) so as to calculate the value of the display irregularity after the heat exposure. As shown in FIG. 1, nine measurement points 2 were set on the surface of a sample for the heat exposure test. The brightness was measured by using a brightness meter (trade name: BM-5A) manufactured by TOPCON CORP. The results of the heat exposure test are shown in the following Table 1.

Display irregularity=$\{T(2)+T(4)+T(6)+T(8)\}/4-\{T(1)+T(3)+T(5)+T(7)+T(9)\}/5$     Equation (i)

In the equation (i), Tx denotes a light transmittance at a measurement point x, and the light transmittance is calculated by using the following equation (ii).

Light transmittance=(sample brightness after heat exposure/brightness of glass sheet alone)×100     Equation (ii)

TABLE 1

| | Coefficient of material having larger photoelastic coefficient | Photoelastic coefficient | | | Viewing angle property | Display irregularity after test |
|---|---|---|---|---|---|---|
| | | Calculated value | Measured value | Δnxz | | |
| Example 1 | 98 | 18 | 21 | 0.035 | A | 0.06 |
| Example 2 | 98 | 18 | 20 | 0.042 | A | 0.06 |
| Example 3 | 98 | 14 | 15 | -(unmeasured) | A | 0.07 |
| Com. Ex. 1 | 88 | 88 | 88 | 0.0047 | A | 0.15 |
| Com. Ex. 2 | 5 ($\times 10^{-8}$ cm$^2$/N) | 5 ($\times 10^{-8}$ cm$^2$/N) | 5 | 0.0014 | B | 0.05 |

As described above, a birefringent optical film of the present invention having a high orientation and a small photoelastic coefficient allows easy control of the retardation value, and thus fluctuation in the retardation value can be suppressed even under a severe condition, i.e., the film has excellent resistance to heat and moisture. Therefore, a birefringent optical film of the present invention can be used suitably for compensating viewing angles of various liquid crystal modes. An optical compensation film or optical compensation elliptically polarizing plate including the birefringent optical film has excellent display uniformity even if heat and moisture are applied. Furthermore, a liquid crystal display including the optical compensation film or optical compensation elliptically polarizing plate provides a wide viewing angle and reduces contrast irregularity that is caused by application of heat and moisture.

The invention may be embodied in other specific forms without departing from the spirit or essential characteristics thereof. The embodiments disclosed in this application are to be considered in all respects as illustrative and not restrictive, the scope of the invention being indicated by the appended claims rather than by the foregoing description, all changes that come within the meaning and range of equivalency of the claims are intended to be embraced therein.

What is claimed is:

1. A birefringent optical film comprising at least two kinds of polymer materials, wherein $\Sigma(Cn \times Wn)$ as a total of products Cn and Wn satisfies a numerical formula (1):

$$\Sigma(Cn \times Wn) \leq 30 \times 10^{-8} \text{ cm}^2/N \quad (1)$$

where Cn and Wn denote respectively a photoelastic coefficient and a volume fraction of each polymer material, and at least one of the polymer materials has a photoelastic coefficient value of at least $60 \times 10^{-8}$ cm$^2$/N, wherein the birefringent optical film comprises a laminate of at least two polymer layers formed of at least one kind of the polymer materials, wherein the birefringent optical film comprises a polymer layer of the polymer material having a photoelastic coefficient of at least $60 \times 10^{-8}$ cm$^2$/N and a polymer layer of a polymer material other than the polymer material having a photoelastic coefficient of at least $60 \times 10^{-8}$ cm$^2$/N, and wherein nx, ny and nz in a polymer layer of the polymer material having a photoelastic coefficient of at least $60 \times 10^{-8}$ cm$^2$/N satisfy numerical formulae (3) and (4):

$$nx \geq ny > nz \quad (3)$$

$$0.005 \leq (nx - nz) \leq 0.1 \quad (4)$$

where nx and ny denote main refractive indices in two directions in the plane of the polymer layer and nz denotes a refractive index in the thickness direction of the polymer layer.

2. The birefringent optical film according to claim 1, wherein $\Sigma(Cn \times Wn)$ as a total of products Cn and Wn satisfies a numerical formula (2):

$$-25 \times 10^{-8} \text{ cm}^2/N \leq \Sigma(Cn \times Wn) \leq 25 \times 10^{-8} \text{ cm}^2/N(2)$$

where Cn and Wn denote respectively a photoelastic coefficient and a volume fraction of each polymer material.

3. The birefringent optical film according to claim 1, comprising a polymer layer formed by stretching and orientating a film of the polymer material having a photoelastic coefficient of at least $60 \times 10^{-8}$ cm$^2$/N.

4. The birefringent optical film according to claim 1, comprising a single polymer layer formed of a mixture of at least two kinds of the polymer materials.

5. The birefringent optical film according to claim 1, wherein at least one of the polymer materials is thermoplastic.

6. The birefringent optical film according to claim 1, wherein the polymer material having a photoelastic coefficient of at least $60 \times 10^{-8}$ cm$^2$/N is at least one selected from the group consisting of polyamide, polyimide, polyester, polyetherketone, polyamide imide, and polyester imide.

7. The birefringent optical film according to claim 1, wherein the polymer material other than the polymer material having a photoelastic coefficient of at least $60 \times 10^{-8}$ cm$^2$/N is at least one selected from the group consisting of acetate resin, polyester resin, polyethersulfone resin, polysulfone resin, polycarbonate resin, polyamide resin, polyimide resin, polyolefin resin, acrylic resin, polynorbornene resin, cellulose resin, polyarylate resin, polystyrene resin, polyvinyl alcohol resin, polyvinyl chloride resin, polyvinylidene chloride resin, polyacrylic resin, a mixture of a thermoplasitc resin whose side chain has a substituted or unsubstituted imide group and a thermoplastic resin whose side chain has a substituted or unsubstituted phenyl group and a nitrile group, and a liquid crystal polymer.

8. An elliptically polarizing plate comprising the birefringent optical film according to claim 1 and a polarizer.

9. A liquid crystal display comprising a liquid crystal cell and the birefringent optical film according to claim 1, wherein the birefringent optical film is arranged on at least one surface of the liquid crystal cell.

10. A liquid crystal display comprising a liquid crystal cell and the elliptically polarizing plate according to claim 7, wherein the elliptically polarizing plate is arranged on at least one surface of the liquid crystal cell.

\* \* \* \* \*